Patented Apr. 13, 1948

2,439,432

UNITED STATES PATENT OFFICE 2,439,432

AMMONIATION OF FERTILIZERS

Frank G. Keenen, Swarthmore, Pa., and Ralph L. Dodge, Wilmington, Del., assignors to E. I. du Pont de Nemours & Company, Wilmington, Del., a corporation of Delaware No Drawing. Application September 27, 1943, Serial No. 504,066

1 Claim. (Cl. 71—43)

This invention relates to a process for the ammoniation of acidic fertilizer materials, and particularly to a process for ammoniation of superphosphate fertilizers by a solid, endothermally-reacting ammoniating agent.

It is known that acidic fertilizer materials, particularly superphosphate, may react with liquid ammoniating agents such as anhydrous ammonia or aqua ammonia, or ammoniacal solutions of nitrogenous fertilizer materials such as urea, ammonium nitrate, or the like to produce improved fertilizers containing available phosphorus and nitrogen. The ammoniation reactions between the free ammonia and acidic components are accompanied by a rise in the temperature of the reaction mixture, and this temperature rise frequently causes or accelerates undesirable reactions resulting in the partial reversion of readily soluble phosphatic compounds to bodies of lower plant food availability. Many methods have been devised for controlling or preventing this temperature rise. Thus, in some instances the reaction is carried out in presence of a liquid phase, which tends to prevent excessive localized over-heating. Also, cooling machinery is frequently employed as disclosed in U. S. Patent 2,305,078, to control the ammoniation temperature. Another method, disclosed in U. S. Patent 2,279,200, is to employ hexamethylene tetramine in combination with urea as a non-exothermic ammoniating agent. In many fertilizer plants it is not convenient to use either the wet processes, or to employ mechanical cooling devices, hence a cheap and readily available means for avoiding the excessive temperature rise in the fertilizer mixtures during ammoniation is desirable.

An object of this invention is to provide an improved process for ammoniation of acidic fertilizers wherein no excessive heat is evolved by the ammoniation reactions. Another object is to provide an improved process for ammoniation of superphosphate wherein a solid endothermic ammoniating agent may be employed. Still another object is to provide an efficient cooling agent, which may be added before, during or after the ammoniation of superphosphate by an exothermic ammoniating agent. A still further object is to provide a cooling agent, which can be used in combination with the presently employed exothermic ammoniating agents and thereby permit ammoniation to a much greater extent than has been possible hitherto with such ammoniating agents.

These and other objects are accomplished in accordance with this invention by employing ammonium bicarbonate as a solid endothermic agent in the ammoniation of acidic fertilizers, particularly superphosphate. The ammoniated superphosphates prepared in accordance with this invention contain little or no calcium carbonate. This is a surprising observation in itself, for ammonium carbonates are frequently used to convert calcium salts to calcium carbonate. A further accomplishment of this invention is that by use of an exothermic ammoniating agent at proper temperature, and in proper quantity, and also in the presence of the ammonium bicarbonate cooling agent, an ammoniated superphosphate which has superior plant food availability is prepared with a minimum of equipment and labor, and in markedly increased production rate.

In ammoniating superphosphate with commonly used ammoniating agents containing volatile ammonia, ammoniation cannot ordinarily be carried beyond the point at which two moles of $NH_3$ are introduced per mole of $P_2O_5$, since the final ammoniation reactions are quite slow, and the volatile ammonia escapes. We have found that in the ammoniation of superphosphate with exothermic agents and ammonium bicarbonate, preferably in sufficient proportion so that the net reaction is endothermic, the reactions are readily completed even when 4 moles of $NH_3$ are introduced per mole of $P_2O_5$. When ammonium bicarbonate is the sole ammoniating agent, we have found that the amount of ammonium bicarbonate which will react readily in the solid form with superphosphate may be as high as 375 lbs. per 1000 lbs. superphosphate.

The predominating endothermic reactions which may occur when ammonium bicarbonate is employed as a cooling agent in ammoniation of superphosphate may best be written as follows, although this invention is not limited by a theory concerning the nature of these endothermic reactions. These equations represent the introduction of the maximum amount of ammonium groups per mole of available $P_2O_5$, which is 4 moles of ammonia per mole of $P_2O_5$ combined initially as $CaH_4(PO_4)_2 \cdot 2H_2O$.

1. $NH_4HCO_3 + CaH_4(PO_4)_2 \cdot 2H_2O \rightarrow$
   $NH_4H_2PO_4 + CaHPO_4 + 3H_2O + CO_2$
2. $NH_4HCO_3 + NH_4H_2PO_4 \rightarrow$
   $(NH_4)_2HPO_4 + H_2O + CO_2$
3. $NH_4HCO_3 + CaHPO_4 + \frac{1}{2}CaSO_4 \rightarrow$
   $\frac{1}{2}Ca_3(PO_4)_2 + \frac{1}{2}(NH_4)_2SO_4 + H_2O + CO_2$
4. $NH_4HCO_3 + (NH_4)_2HPO_4 + 1\frac{1}{2}CaSO_4 \rightarrow$
   $\frac{1}{2}Ca_2(PO_4)_2 + 1\frac{1}{2}(NH_4)_2SO_4 + H_2O + CO_2$
5. (overall reaction) $2CaSO_4 + 4NH_4HCO_3 + CaH_4(PO_4)_2 \cdot 2H_2O \rightarrow$
   $Ca_3(PO_4)_2 + 2(NH_4)_2SO_4 + 6H_2O + 4CO_2$ Hitherto, in the ammoniation of superphosphate, it has been customary to introduce about 25 parts of ammonia per 1000 parts of superphosphate. This corresponds to only about one mole ammonia per mole of $P_2O_5$, which is approximately that required for reaction (1). The products obtained in accordance with reactions (1) and (2) are excellent plant foods. When the endothermic ammoniating agents containing solid ammonium bicarbonate cooling agent are used, approximately 80 to 90 parts of ammonia are readily introduced per 1000 parts of superphosphate, and no calcium carbonate is produced. For purposes of clarification, this is sufficient to complete reactions (1) to (4), as summarized in the overall reaction (5). The so-called precipitated tricalcium phosphate produced under low temperature conditions, possible heretofore only with mechanical cooling devices, has plant food availability superior to the products resulting from high temperature ammoniation reactions which lead to basic highly insoluble phosphates.

In the ammoniation of ordinary superphosphate with solid finely divided ammonium bicarbonate, as a cooling agent, the temperature of the ammoniation mixture is readily controlled by various means, such as by the degree of thermal insulation surrounding the mixture, or by the use of an exothermic agent. The preferred temperature is within the range 23° F. to 80° F. At temperatures below 23° F., the reaction is so slow as to require several days for completion, and at temperatures above 80° F., and particularly above 100° F., the formation of unavailable calcium compounds become noticeable. At temperatures below 0° F. the reaction is so slow as to be almost imperceptible. The preferred temperature range is generally attained merely by mixing the preferred quantity of ammonium bicarbonate with the superphosphate, both reactants being finely divided and well mixed. This preferred quantity of ammonium bicarbonate is 100 to 250 pounds per thousand pounds of superphosphate, although obviously a smaller quantity could be employed with conversion of only a fraction of the superphosphate. In general, a temperature drop of 25° to 35° F. accompanies the mixing of the preferred quantities of superphosphate and ammonium bicarbonate.

Among the agents which may be used in combination with ammonium bicarbonate for controlling temperature in ammoniation of superphosphate are the following: urea-ammonia mixtures, ammonia, calcium cyanamide, hexamethylene tetramine and neutralizing agents such as lime. Combinations of these agents and ammonium bicarbonate may be employed under conditions which cause a temperature increase in the ammoniation mixture, but this increase is in all instances smaller than it would be if no ammonium bicarbonate were present.

In one specific embodiment, superphosphate is admixed with about 1 to 4% of ammonia (preferably dissolved in water in the form of a concentration solution), and a weight of ammonium bicarbonate equal to between 4 to 7 times the weight of ammonia; the ammoniation reaction proceeds with little or no apparent change in temperature, because the exothermic heat of the ammonia reactions is compensated by the endothermic heat of the ammonium bicarbonate reactions. Instead of aqueous ammonia, a suitable quantity of other neutralizing agent such as calcium cyanamide (generally 4 to 16 lbs. per 100 pounds of superphosphate) may be employed as the exothermic agent. About 1.5 to 3.0 pounds of ammonium bicarbonate is conveniently employed to neutralize the heat evolved per pound of cyanamide added to 100 pounds of superphosphate.

The following examples will serve further to describe our invention.

*Example 1.*—A mixture of 1000 lbs. of run-of-pile superphosphate and 375 lbs. of ammonium bicarbonate is mixed in a rotary drum for two minutes, and is then removed to a storage space which permits escape of $CO_2$. The temperature of the ingredients drops from 77° at the time of mixing to 23° after 5 hours storage. Thereafter the temperature rises to the temperature of the surroundings, and evolution of carbon dioxide ceases. The product is a powdery solid which contains no carbonate.

*Example 2.*—A mixture containing 2200 lbs. superphosphate, 150 lbs. ammonium bicarbonate, and 110 lbs. "UAL" (a urea-ammonia liquor containing 30% $NH_3$) has a temperature of 82° at the instant at which these ingredients are mixed. Almost immediately the temperature rises to 95° F., but as the reaction proceeds for one hour the temperature again drops to 82° F. A parallel run is made in the same apparatus with the same number of equivalents of ammonia introduced as free $NH_3$ instead of as "UAL" and bicarbonate. The temperature increases to 187° F.

*Example 3.*—To 1000 pounds of superphosphate is added 110 pounds of ammonium bicarbonate, and these ingredients are thoroughly mixed. During the first 30 minutes temperature drops from 77° F. to 50° F. due to the endothermic reactions. The amount of ammoniation is determined by measurement of the evolved carbon dioxide. Thus, after the first 5 minutes, 4 pounds of ammonia has been introduced; after 15 minutes, 11 pounds; and after 30 minutes, 17 pounds. After 3 days the mixture contains no unreacted ammonium bicarbonate, and no calcium carbonate. The product is found to be an excellent fertilizer.

*Example 4.*—To 1000 pounds superphosphate is added, with thorough mixing, 40 pounds of calcium cyanamide and 70 pounds of ammonium bicarbonate. The mixture is allowed to stand for one hour, during which time the temperature of the powdery mass rises from 77° F. to 89° F. Evolution of carbon dioxide is extremely slow after the first hour of reaction. The product is found to be an excellent fertilizer.

The superphosphates which may be used in accordance with this invention include the ordinary superphosphate of commerce, or other superphosphates made from rock phosphate and mineral acid, preferably superphosphates containing 15 to 50% available $P_2O_5$.

The ammoniation of superphosphate as described above may be conducted in any suitable mixing equipment, such as a conventional mixing drum equipped with means for allowing escape of carbon dioxide.

We claim:

The process for producing fertilizer which consists essentially in mixing an acid super-phosphate substantially simultaneously with calcium cyanamide, which reacts exothermally therewith, and with ammonium bicarbonate, which reacts endothermally therewith, in the proportions such as that there are added from 4 to 16 parts by weight of calcium cyanamide per 100 parts of super-phosphate, and 1.5 to 3 parts by weight of ammonium bicarbonate per part of calcium cyanamide, whereby the heat absorbed during the endothermic reaction with ammonium bicarbonate is substantially compensated by the heat given off during the exothermic reaction of the super-phosphate with the calcium cyanamide, and reversion of the phosphate to compounds which are substantially unavailable as fertilizers is prevented.

FRANK G. KEENEN.
RALPH L. DODGE.

REFERENCES CITED

The following references are of record in the file of this patent:

UNITED STATES PATENTS

| Number | Name | Date |
|---|---|---|
| 1,275,276 | Lie | Aug. 13, 1918 |
| 1,546,562 | Breslauer | July 21, 1925 |
| 1,949,129 | Oehme | Feb. 27, 1934 |
| 2,048,658 | Jannek | July 21, 1936 |
| 2,102,830 | Brill | Dec. 21, 1937 |
| 2,279,200 | Keenan | Apr. 7, 1942 |
| 2,348,343 | Holbrook | May 9, 1944 |
| 2,415,464 | Crittenden | Feb. 11, 1947 |

FOREIGN PATENTS

| Number | Country | Date |
|---|---|---|
| 9,636 | Great Britain | 1886 |
| 75,801 | Sweden | Nov. 7, 1928 |
| 351,130 | Germany | Apr. 1, 1922 |
| 357,461 | Great Britain | Sept. 24, 1931 |

Certificate of Correction

Patent No. 2,439,432.  April 13, 1948.

FRANK G. KEENEN ET AL.

It is hereby certified that error appears in the printed specification of the above numbered patent requiring correction as follows: Column 5, line 9, for the word "with" read *solid*; and that the said Letters Patent should be read with this correction therein that the same may conform to the record of the case in the Patent Office.

Signed and sealed this 8th day of June, A. D. 1948.

[SEAL]

THOMAS F. MURPHY,
*Assistant Commissioner of Patents.*